April 18, 1933.    W. CRAIK    1,903,982
SHAFT COUPLING
Filed Jan. 25, 1932    2 Sheets-Sheet 1
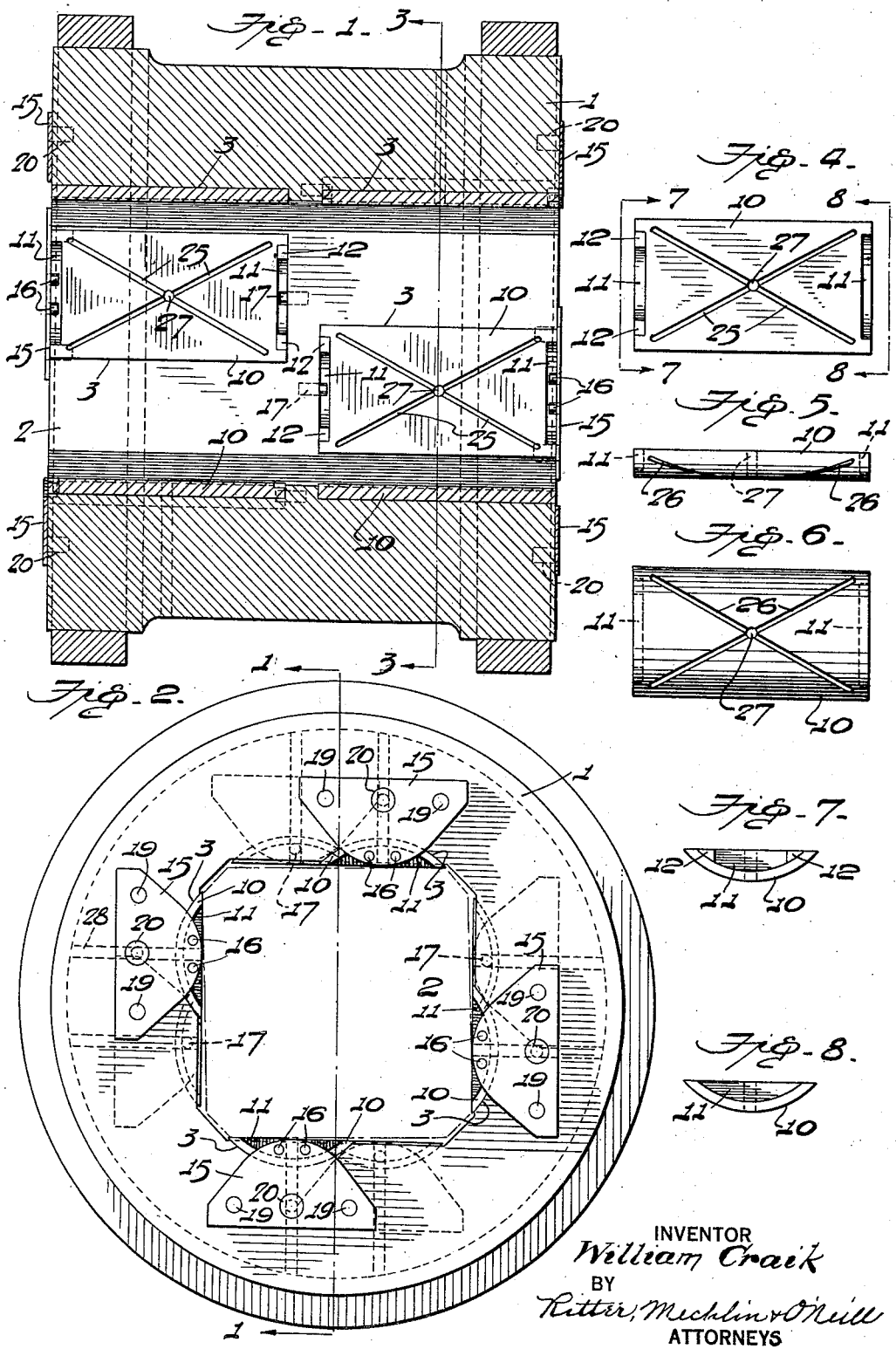

April 18, 1933.   W. CRAIK   1,903,982
SHAFT COUPLING
Filed Jan. 25, 1932   2 Sheets-Sheet 2
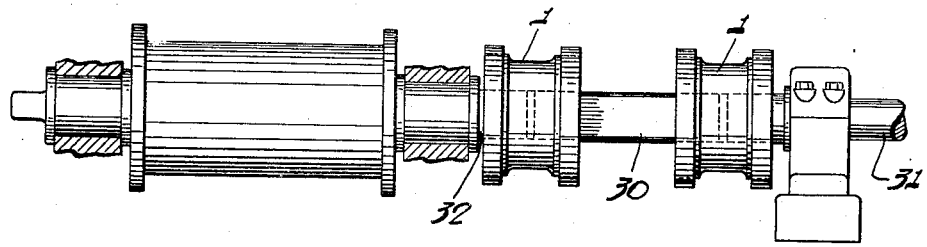
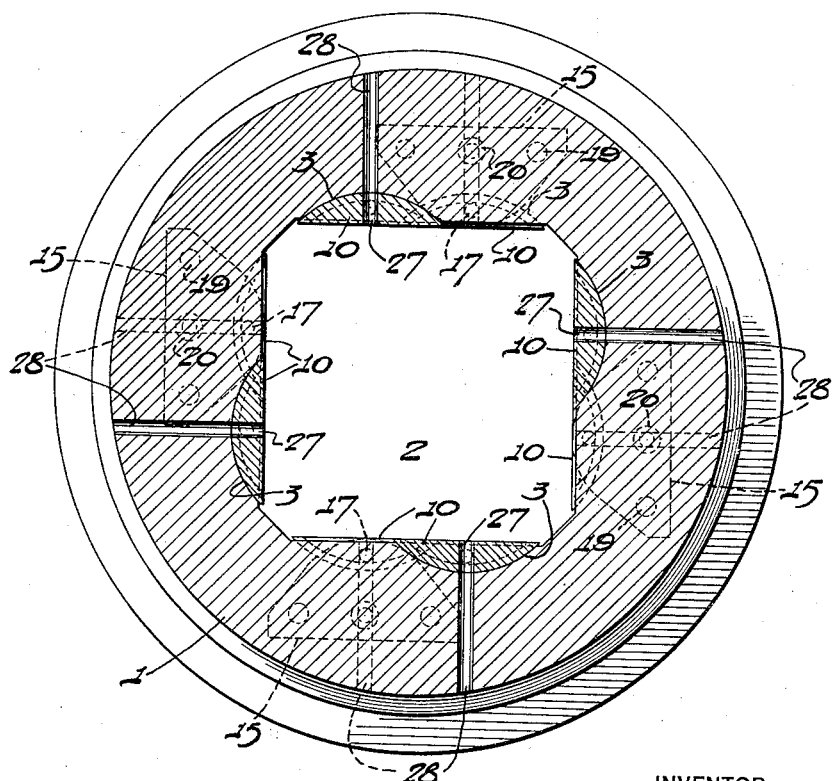
INVENTOR
William Craik
BY
Ritter, Mechlin & O'Neill
ATTORNEYS Patented Apr. 18, 1933

1,903,982

UNITED STATES PATENT OFFICE

WILLIAM CRAIK, OF PAAUILO, TERRITORY OF HAWAII

SHAFT COUPLING

Application filed January 25, 1932. Serial No. 588,790.

The invention relates to coupling boxes for sugar cane mills and the like, adapted to couple the square ends of shafts connecting the rolls with the driving means, and has for its object to provide the inner faces of the boxes with arcuate or convex recesses to receive wear blocks having the form of cylindrical segments fitting said recesses and capable of limited rotary movement therein to take up the stresses between the shafts and the boxes and prevent the edges of the shafts scoring or abrading the inner walls of the boxes.

The invention is illustrated in the accompanying drawings, in which:—

Fig. 1 is a section of the box on line 1—1 of Fig. 2.

Fig. 2 is an end elevation.

Fig. 3 is a section on line 3—3 of Fig. 1.

Figs. 4 to 8, inclusive, are detailed views of the wear blocks.

Fig. 9 is a partial elevation of a mill illustrating the application of the coupling thereto.

Referring to the drawings, 1 indicates the box or main coupling member constructed as a heavy casting, generally cylindrical in form, having a longitudinal bore 2 substantially square in cross section adapted to receive the ends of squared shafts for the purpose of coupling the shaft sections together. In sugar cane mill practice, it is customary to make the openings through the box somewhat larger than the end of the mill shaft engaging the opening to permit a small perpendicular movement of the upper roll of the mill during the feeding of the cane through the mill. When the shaft and the coupling are driven by the usual gearing, the edges of the squared shaft engage the inner faces of the box and abrade, score or groove the faces, thereby producing an excessive lost motion between the coupling box and the shafts in engagement therewith.

As stated, the invention is designed primarily to overcome this objection and to substantially eliminate wear between the square ends of the shafts and the interior walls of the coupling boxes. As indicated in the drawings, there is formed in each wall, defining the interior of the box, two arcuate recesses 3, each of which extends longitudinally of the bore for a distance somewhat less than half the length of the bore, the recesses being staggered, one being located near one marginal edge of the wall and the other near the other marginal edge.

Fitted in each of said recesses 3 is a wear block 10, which is formed as a cylindrical segment, the convex wall of which engages the bottom of the arcuate recess and the flat face of which extends a short distance beyond the plane of the corresponding wall of the box. Preferably each of the wear blocks is made of steel or other wear resisting metal and, as indicated, each wear block fits snugly within the corresponding recess and is capable of rotation in said recess. Each wear block is provided at its opposite ends with arcuate slots 11, the slot on the inner end of the block being provided with shoulders 12, 12, which constitute stops. Each wear block is held in place within its cooperating recess by means of a guard plate 15, which is secured to the lateral face of the box by means of dowel pins 19, 19 and a threaded bolt 20. Each of the guard plates 15 is provided with two pins 16, 16, which extend inwardly within the arcuate slot 11. The opposite end of each wear block is supported by a dowel pin 17 fixed in the inner vertical wall of the recess 3 and projecting into the corresponding arcuate slot 11. By this particular arrangement, each of the wear blocks is held in its corresponding recess in position to be engaged by the edges or corners of the square shaft engaging the box. As there are two square shaft ends engaging each box, one of which is the driving and the other the driven member, when the mill is in operation, the shafts will be canted slightly in opposite directions with respect to the box and it is for this reason that the wear blocks on each inner wall of the box are staggered, so that the edges of the driving shaft will engage one set of four wear blocks and the driven shaft will engage the diagonally opposite wear blocks of the respective faces, the relation of one of the shafts to the wear blocks being illustrated in dotted lines in Fig. 2. It will be seen, therefore, that instead of the edges of the squared shaft sections engaging the inner walls of the box and scoring or grooving said walls, a considerable portion of each lateral face of the shaft ends will engage the flat face of the wear block, as the latter is rotated to a small extent in its recess, without interfering, however, with the necessary up and down movement of the shaft of the mill roller, due to the passage of the cane through the mill. As the wear blocks afford relatively large surface engagements with the sides of the squared shaft ends and each wear block has an extensive engagement between its convex face and the concave face of the recess, it will be apparent that wear between the shafts and the coupling box will be reduced to a minimum.

Preferably means are provided for lubricating the engaging faces of the wear blocks and the walls of the box and also between the wear blocks and the lateral faces of the squared shafts and, for this purpose, the flat face of each wear block 10 is provided with cross grooves 25 and the convex surface with similar cross grooves 26, these grooves being connected by an opening 27, which is normally in registry with an oil duct 28 formed in the box. This series of ducts will distribute oil or other suitable lubricant to the contacting faces of the wear blocks, shafts and the box, thereby further reducing any tendency of these faces to wear or score under the heavy stresses imposed on the system.

A conventional application of the invention to a standard mill is illustrated in Fig. 9, in which 31 indicates the shaft which drives the upper roll of the mill, 30 the intermediate shaft which connects 31 with the shaft 32 of the roll and 1, 1 the two coupling boxes which serve to connect the square shaft 30 with the square ends of the shafts 31 and 32, respectively.

What I claim is:

1. A coupling box for shafts having square ends, said box having a square opening provided with arcuate recesses in the walls defining said opening, and wear blocks having the form of cylindrical segments fitting said recesses.

2. A coupling box for shafts having square ends, said box having a square opening provided with arcuate recesses in the walls defining said opening, wear blocks having the form of cylindrical segments fitting said recesses, and guard plates fixed to the ends of the box to retain the wear blocks in position.

3. A coupling box having a square opening provided with arcuate recesses in the walls defining said opening, wear blocks having the form of cylindrical segments fitting said recesses and having segmental grooves in their ends, guard plates fixed to the ends of the box and having pins engaging the grooves on the outer ends of said box and a dowel pin in the end wall of each recess engaging the groove in the opposite end of the corresponding wear block.

In testimony whereof I affix my signature.

WILLIAM CRAIK.